(12) United States Patent
Shigeoka et al.

(10) Patent No.: US 7,374,344 B2
(45) Date of Patent: May 20, 2008

(54) WHEEL SUPPORT BEARING ASSEMBLY

(75) Inventors: Kazuhisa Shigeoka, Iwata (JP); Katsumi Furukawa, Iwata (JP)

(73) Assignee: NTN Corporation, Osaka (JP)

( * ) Notice: Subject to any disclaimer, the term of this patent is extended or adjusted under 35 U.S.C. 154(b) by 287 days.

(21) Appl. No.: 11/327,372

(22) Filed: Jan. 9, 2006

(65) Prior Publication Data
US 2006/0159377 A1 Jul. 20, 2006

(30) Foreign Application Priority Data
Jan. 18, 2005 (JP) ............... 2005-010304

(51) Int. Cl.
F16C 19/08 (2006.01)
G01B 7/30 (2006.01)
G01P 3/48 (2006.01)
(52) U.S. Cl. .............. 384/448; 324/207.25; 324/173
(58) Field of Classification Search ........ 384/446–449; 324/173–174, 207.25; 267/113; 403/206, 403/216.1, 217.1, 225, 359.2, 371
See application file for complete search history.

(56) References Cited

U.S. PATENT DOCUMENTS 2,115,458 A * 4/1938 Geyer .................. 267/113
4,147,468 A * 4/1979 Murakami et al. ....... 415/216.1
5,640,087 A * 6/1997 Alff ......................... 324/173
6,127,819 A * 10/2000 Ouchi ....................... 384/448

FOREIGN PATENT DOCUMENTS

| JP | 7-31539 | 6/1995 |
|---|---|---|
| JP | 09-061443 | 3/1997 |
| JP | 11-183493 | 7/1999 |

* cited by examiner

Primary Examiner—Marcus Charles

(57) ABSTRACT

To provide a wheel support bearing assembly designed to avoid an ingress of foreign matter from an area, where a sensor is fitted, into the inside of the bearing assembly. The wheel support bearing assembly includes an outer member (1) adapted to be secured to a vehicle body structure, an inner member (2) adapted to support a vehicle wheel, and circular rows of rolling elements (3) interposed between the outer and inner members (1,2). A sensor cap (13) is provided for closing an inboard end of the outer member (1) and has an insert nut (15) embedded therein. The sensor cap (13) is also provided with a reduced diameter hole (23), in which an elastic sealing member (25) is interposed under interference fit between it and a deep end face of the insert nut (15).

6 Claims, 4 Drawing Sheets

WHEEL SUPPORT BEARING ASSEMBLY

BACKGROUND OF THE INVENTION

1. Field of the Invention

The present invention generally relates to a rolling bearing assembly for rotatably supporting a vehicle wheel and, more particularly, to the wheel support bearing assembly incorporating a rotation sensor mounted on a sensor cap closing one open end of the bearing, for detecting the number of revolutions of the vehicle wheel.

2. Description of the Prior Art

Some of the vehicle wheel bearing assemblies are known, in which a rotation detecting device for detecting the number of revolutions of vehicle wheels is incorporated for the purpose of performing various controls, for example, for controlling an automobile anti-skid control system, also known as an anti-lock brake system (ABS), and a traction control system (TCS). This rotation detecting device includes a pulsar ring fitted to a rotatable member of the bearing assembly for rotation together therewith and a sensor fitted to a stationary member of the same bearing assembly. In the case of a vehicle driven wheel having the sensor incorporated on an inboard side, the sensor is generally installed in a sensor cap used to close one of opposite open ends of an annular bearing space delimited between the rotatable and stationary members. See, for example, the Japanese Laid-open Utility Model Publication No. 7-31539, the Japanese Laid-open Patent Publication No. 9-61443 and the Japanese Patent No. 3440800.

The wheel support bearing assembly, in which the sensor is installed in the sensor cap, is illustrated in FIGS. 3 and 4. The wheel support bearing assembly shown therein is of a structure designed to rotatably support a vehicle driven wheel and includes an outer member 31 rigid with a vehicle body structure, and an inner member 32 having a vehicle wheel secured thereto for rotation together therewith, and a plurality of, for example, two, rows of rolling elements 3 accommodated within an annular bearing space delimited between the inner and outer members 31 and 32 and spaced a distance axially from each other. The inner member 32 is made up of an hub axle and an inner race forming segment 35 fixedly mounted on an inboard end of the hub axle as shown in FIG. 3. A pulsar ring 39 is secured to the inner race forming segment 35 and, on the other hand, a sensor cap 43 made of a synthetic resin is secured to the outer member 31 so as to close an inboard open end of the annular bearing space between the outer and inner members 31 and 32.

The sensor cap 43 is provided with the sensor 40 therewith and arranged so as to confront the pulsar ring 39 in a direction axially of the bearing assembly, and the sensor 40 cooperates with the pulsar ring 39 to define a rotation sensor unit 38. A portion of FIG. 3 indicated by the phantom circle IV is shown on an enlarged scale in FIG. 4. As shown therein, the sensor 40 is fitted to a sensor support member 49 and is fixedly inserted into a sensor insertion hole 46 defined in the sensor cap 43 with the sensor support member 49 arranged on an outer surface of the sensor cap 43. When the sensor support member 49 is firmly fastened to the sensor cap 43 by means of at least one sensor fastening bolt 52, the sensor 40 can be firmly locked to the sensor cap 43. This fastening of the sensor support member 49 with the sensor fastening bolt 52 is carried out by threading the sensor fastening bolt 52 into an insert nut 45 embedded in the sensor cap 43.

It has, however, been found that the foregoing construction has the following problem associated with an undesirable ingress of foreign matter into the bearing assembly. Specifically, foreign matter such as, for example, muddy water may ingress through slight gaps between the internal threads of the insert nut 45 and the sensor fastening bolt 52 and surfaces of contact between the sensor fastening bolt 52, the sensor support member 49 and the sensor cap 43 and then into the interior of the bearing assembly, and particularly the annular bearing space, through an axial bottom hole 42 defined in the sensor cap 43. The foreign matter such as, for example, muddy water may also ingress through surfaces of contact between the insert nut 45 and a portion of the sensor cap 43 made of the synthetic resin. Once such ingress of the foreign matter into the interior of the bearing assembly occurs, not only will the lifetime of the bearing assembly be lowered, but also the pulsar ring may possibly be deteriorated.

SUMMARY OF THE INVENTION

In view of the foregoing, the present invention has for its object to provide an improved wheel support bearing assembly designed to avoid an undesirable ingress of foreign matter such as, for example, muddy water, into the interior of the bearing assembly through gaps present in the vicinity of the threaded hole for securement of the sensor, the sensor support member and/or the sensor fastening bolt.

In order to accomplish the foregoing and other objects and features, the present invention provides a wheel support bearing assembly including an outer member adapted to be secured to a vehicle body structure and having an inner peripheral surface formed with a plurality of raceways defined therein, an inner member adapted to support a vehicle wheel and having raceways defined therein in alignment with the respective raceways in the outer member, and corresponding circular rows of rolling elements each row interposed between the raceway in the outer member and the raceway in the inner member. In this wheel support bearing assembly, the following features are employed in accordance with the teachings of the present invention.

A sensor cap is secured to an inboard end of the outer member to close an inboard opening of the outer member. A portion of the sensor cap, which is made of a synthetic resin, is embedded with an insert nut with its one open end opening at outer surface of the sensor cap, and a sensor insertion hole is defined in the sensor cap in a juxtaposed relation with the insert nut. A sensor support member carrying a sensor is arranged on an outer surface of the sensor cap with the sensor inserted into the sensor insertion hole. This sensor support member has a bolt insertion hole defined therein, and a sensor fastening bolt is inserted into the bolt insertion hole and then threaded into the insert nut to fix the sensor support member to the sensor cap. A pulsar ring cooperable with the sensor is provided on the inner member so as to confront the sensor. The sensor cap has a reduced diameter hole defined therein at a location adjacent a deep end face of the insert nut so as to communicate between an internally threaded bore of the insert nut and the inside of the sensor cap. This reduced diameter hole has an inner peripheral surface formed with a counter surface confronting the deep end face of the insert nut. A sealing member having an elasticity is interposed between the counter surface of the reduced diameter hole and the deep end face of the insert nut under interference fit therebetween to thereby seal. In other words, the sealing member is received within the reduced diameter hole in a state compressed radially inwardly to such an extent as to allow the sealing member to contact the counter surface of the reduced diameter hole when nested within the reduced diameter hole.

The sensor referred to above may be a rotation sensor for detecting revolution of the inner member relative to the outer member.

According to the present invention, surfaces of contacts of the internally threaded bore of the insert nut and between the outer periphery of the insert nut and that portion of the sensor cap, which is made of the synthetic resin, are communicated with the inside of the bearing assembly only through the reduced diameter hole and nowhere in the vicinity of the internally threaded bore and the sensor fastening bolt is communicated with the inside of the bearing assembly. The reduced diameter hole referred to above is sealed in the presence of the sealing member. For this reason, slight gaps present between the internally threaded bore of the insert nut, the sensor fastening bolt and the sensor support member are sealed off from the inside of the bearing assembly and an undesirable ingress of the foreign matter such as, for example, muddy water into the inside of the bearing assembly through those gaps can be prevented by the sealing function of the sealing member.

In a preferred embodiment of the present invention, the sealing member referred to above may be a rubber ball. Material for the rubber ball may be chosen from the group consisting of nitrile rubber, fluorocarbon rubber, acrylic rubber and hydrogenated nitrile rubber. The sealing member in the form of the rubber ball is convenient in that the sealing member can easily be mounted.

Where the sealing member is employed in the form of the rubber ball, the reduced diameter hole represents a hole that forms an interference allowance (represented by the difference in diameter between the rubber ball and the diameter of the reduced diameter hole) with the rubber ball and may be formed in part in a thick walled portion of the sensor cap, which is positioned at a location aligned with the deep end face of the insert nut, and in part in an annular protrusion protruding rearwardly of the thick walled portion and having an inner peripheral surface thereof defining the counter surface. Thus, where the annular protrusion is employed having its inner peripheral surface thereof defining the counter surface and the reduced diameter hole has an inner surface that forms the interference allowance with the rubber ball, the sealing member in the form of the rubber ball can easily be fitted with a simplified structure and can also provide an excellent sealing effect.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, a wheel support bearing assembly according to a preferred embodiment of the present invention will be described in detail with particular reference to FIGS. 1 and 2. The wheel support bearing assembly as shown therein is in the form of a dual row angular contact ball bearing and is particularly intended for use in rotatably supporting a vehicle driven wheel. It is to be noted that in the description set forth hereinabove and hereinafter, the terms "inboard" and "outboard" are a relative term intended to speak of the direction or orientation with respect to the transverse sense of an automotive vehicle incorporating the wheel support bearing assemblies of the present invention, in which the inboard and outboard sides are close to and remote from the transverse sense of the automotive vehicle, respectively. For example, inboard and outboard ends of an elongated element represent the respective ends of the elongated element close to and remote from the transverse sense of the automotive vehicle. Hence, as viewed in FIG. 1, left and right sides of the figure are interchangeable with the outboard and inboard sides, respectively.

Figure 1:
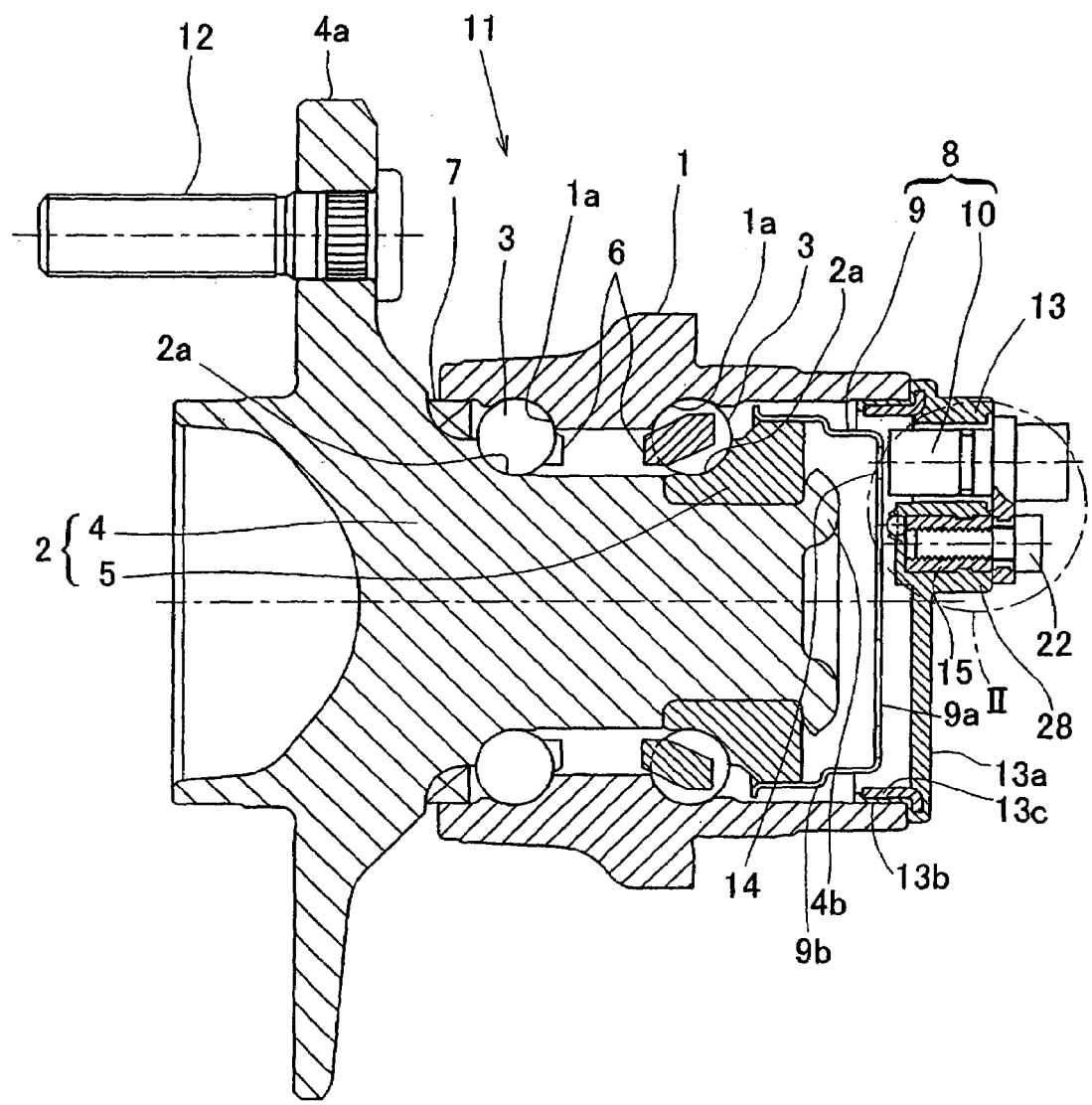
FIG. 1 is a fragmentary longitudinal sectional view of a wheel support bearing assembly according to a preferred embodiment of the present invention.
Figure 2:
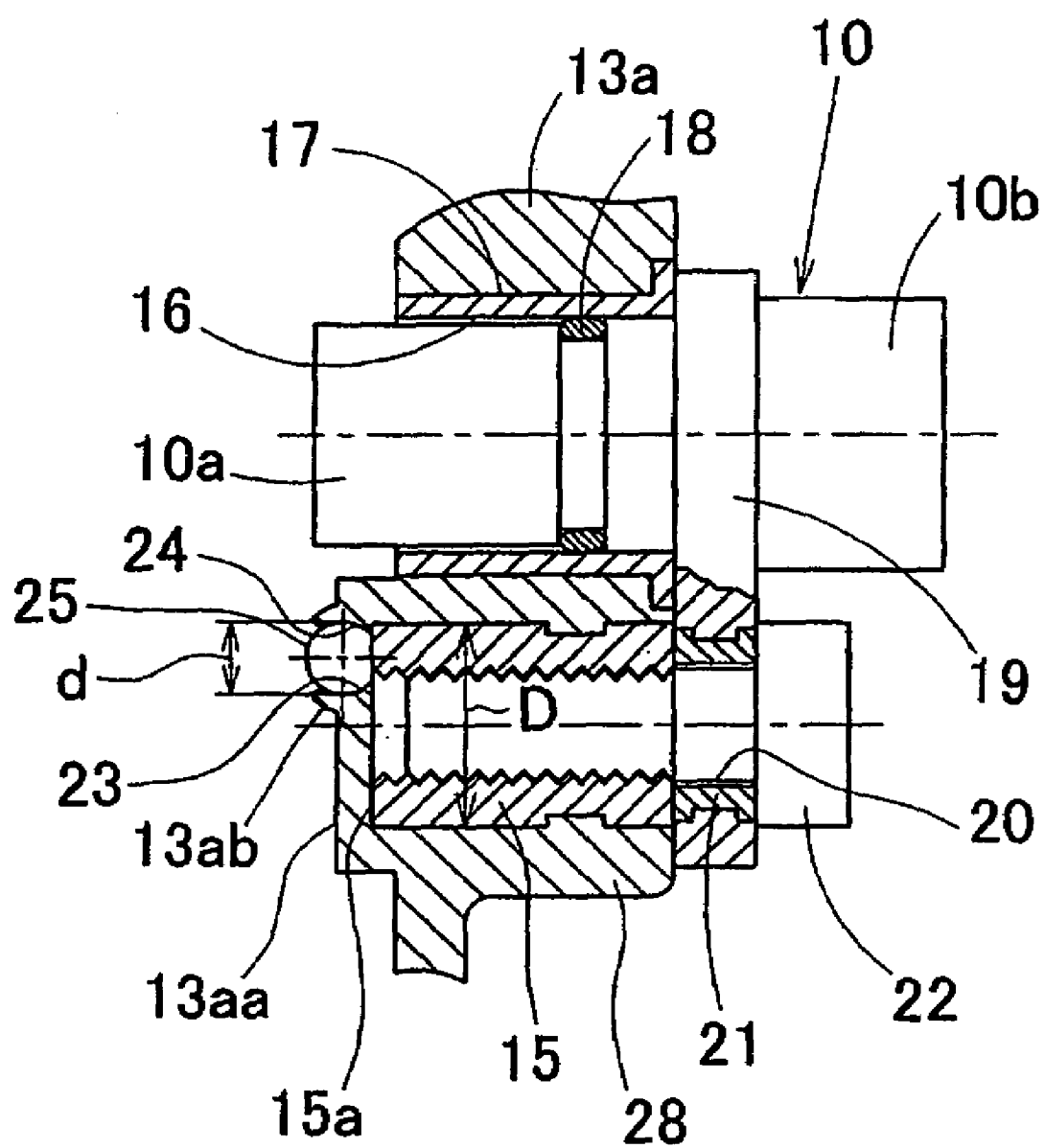
FIG. 2 is a similar sectional view showing, on an enlarged scale, a portion of the wheel support bearing assembly encircled as at II in FIG. 1.
Figure 3:
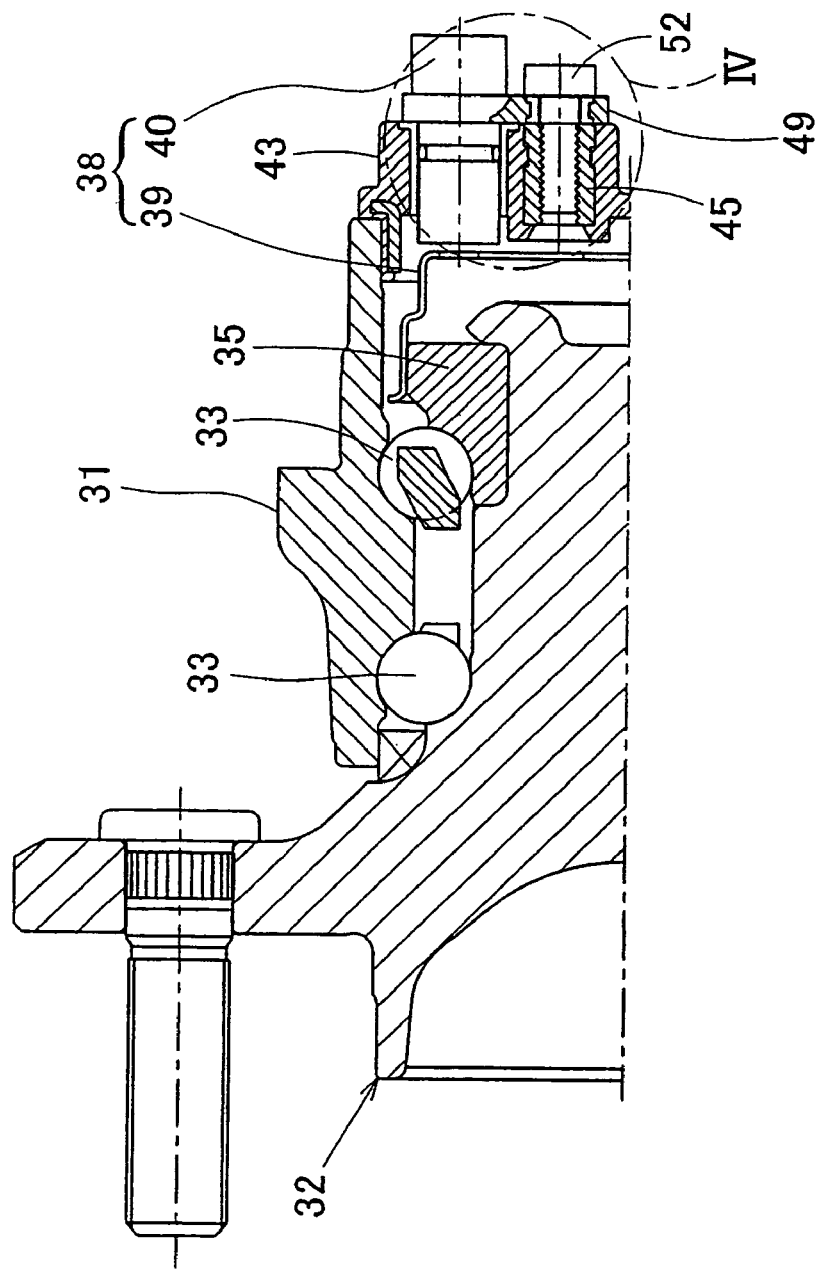
FIG. 3 is a fragmentary longitudinal sectional view of the conventional wheel support bearing assembly.
Figure 4:
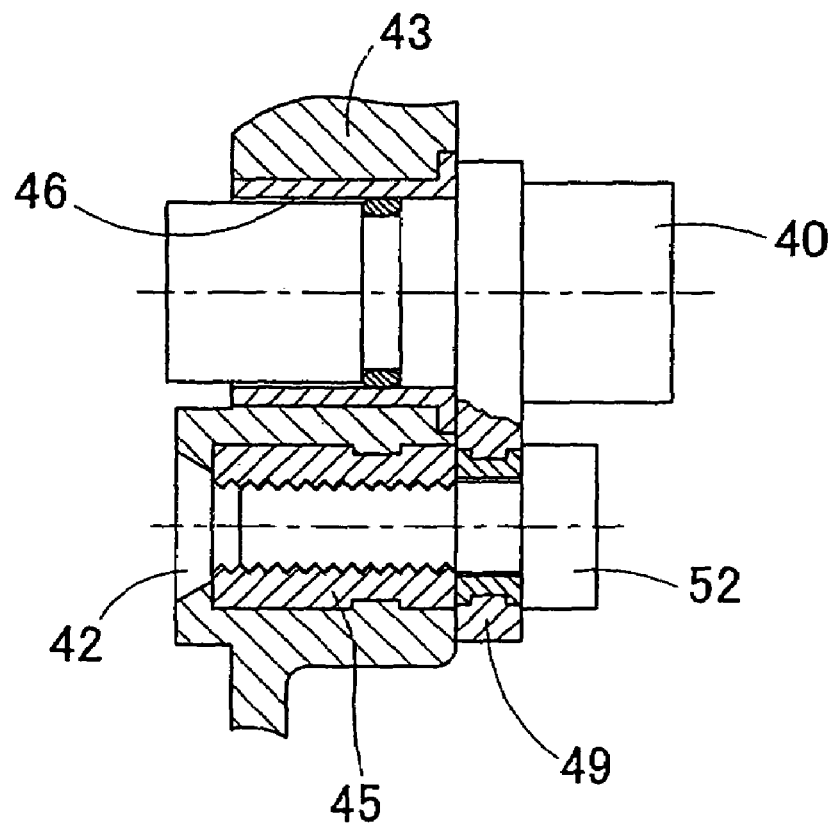
FIG. 4 is a similar sectional view showing, on an enlarged scale, of a portion of the wheel support bearing assembly encircled as at IV in FIG. 3.

The wheel support bearing assembly best shown in FIG. 1 is utilized to support a vehicle driven wheel rotatably relative to an automotive body structure and includes a bearing unit 11, which is made up of a generally tubular outer member 1 having its inner peripheral surface formed with axially spaced apart raceways 1a, an inner member 2 generally positioned inside the tubular outer member 1 and having raceways 2a defined therein in alignment with the associated raceways 1a in the outer member, and a plurality of, for example, two, rows of rolling elements 3 each row interposed between the raceways 1a and 2a in the outer and inner members 1 and 2. The raceways 1a and 2a have their respective contact angles so defined as to achieve a back-to-back alignment. The rolling elements 3 are in the form of a ball and are operatively retained by a ball retainer 6 for each row thereof. An annular bearing space delimited between the outer and inner members 1 and 2 has inboard and outboard open ends opposite to each other and the outboard open end of this annular bearing space is sealed by a contact-type sealing member 7 such as, for example, an oil seal.

The outer member 1 forms a stationary or non-rotatable member and is adapted to be secured to the vehicle body structure through a vehicle body connecting flange (not shown) integral with the outer member 1. On the other hand, the inner member 2 forms a rotatable member and is made up of an hub axle 4 having an outboard end formed with a radially outwardly extending wheel mounting flange 4a, and an inner race segment 5 press-fitted onto an inboard end of the hub axle 4 for rotation together therewith. This inner race segment 5 is fixed axially immovably in position in coaxial relation with the hub axle 4 by means of a flange-shaped crimped portion 4b formed in the inboard end of the hub axle 4. The raceways 2a described as provided in the inner member 2 are in practice defined in the hub axle 4 and the inner race segment 5, respectively. Although not shown, the vehicle wheel is firmly secured to the wheel mounting flange 4a of the hub axle 4 by means of a plurality of bolts 12 in any manner known to those skilled in the art.

The inner race segment 5 forming a part of the inner member 2 has a pulsar ring 9 fitted thereto, which ring 9 forms a to-be-detected element of a rotation sensor unit 8. On the other hand, a sensor 10 is mounted on the outer member 1 through a sensor cap 13 so as to axially confront the pulsar ring 9. This sensor 10 cooperate with the pulsar ring or to-be-detected element 9 to define the rotation sensor unit 8 for detecting the number of revolutions of the inner member 2 relative to the outer member 1.

The pulsar ring 9 is in the form of a cup-like configuration made up of a disc area 9a and a generally cylindrical wall 9b protruding axially outwardly from an outer periphery of the disc area 9a and is secured to the inboard end of the hub axle 4, particularly the inner race segment 5 with the axially extending cylindrical wall 9b capped under interference fit onto an outer periphery of the inboard end of the inner race segment 5. In this condition, the disc area 9a of the pulsar ring 9 is held in position intervening between the inboard end of the hub axle 4 and the sensor cap 13.

The disc area 9a of the pulsar ring 9 is formed with a circular row of windows or perforations 14 spaced equidistantly from each other in a direction circumferentially of the disc area 9a. The sensor 10 referred to above is in the form of a passive type sensor and is positioned to align with the path of travel of the windows 14 during the rotation of the inner member 2 relative to the outer member 1 so that the sensor 10 can detect intermittent passage of those windows 14 during the rotation of the inner member 2 to thereby provide a rotation detection signal of a frequency proportional to the number of revolutions of the inner member 2.

It is to be noted that the pulsar ring 9 may be in the form of a disc-shaped magnetic encoder such as, for example, a multipolar magnet having a plurality of opposite north and south magnetic poles alternating in a direction circumferentially thereof.

The sensor cap 13 is also in the form of a cup-like configuration made up of a disc-shaped end plate 13a and a generally cylindrical wall 13b protruding axially outwardly from an outer periphery of the end plate 13a. This sensor cap 13 is formed of a resin by the use of any known injection molding technique together with a metallic reinforcement ring 13c and is secured to the outer member 1 with the axially protruding cylindrical wall 13b press-fitted into the bore of the outer member 1 to thereby close an inboard open end of the outer member 1. The metallic reinforcement ring 13c forming a part of the sensor cap 13 is inserted within the axially protruding cylindrical wall 13b so as to occupy an inner peripheral portion thereof, thereby to assist the interference fit of the cylindrical wall 13b into the bore of the outer member 1.

At least the disc-shaped end plate 13a of the sensor cap 13, which lies in a plane perpendicular to the longitudinal axis of the bearing assembly is made of a synthetic resin. This disc-shaped end plate 13a is formed integrally with a mounting boss 28 so as to protrude in a direction axially thereof, and an insert nut 15 is embedded within this mounting boss 28 with its one opening end opening at outer surface of the mounting boss 28. The disc-shaped end plate 13a is also formed with a sensor insertion hole 16 juxtaposed to the insert nut 15 in the mounting boss 28 for receiving therein a part of the sensor 10. Specifically, the sensor 10 has a stud end 10a and a base end 10b opposite to the stud end 10a and is received within the sensor insertion hole 16 through a sleeve 17 that is fixedly inserted into the sensor insertion hole 16 so as to intervene between a peripheral wall defining the sensor insertion hole 16 and the stud end 10a. An O-ring seal 18 is mounted on the stud end 10a of the sensor 10 and intervenes between an inner peripheral surface of the sleeve 17 and an outer peripheral surface of the stud end 10a of the sensor 10 to thereby seal a gap therebetween.

The sensor 10 is fitted to a sensor support member 19 through the base end 10b thereof, which protrudes outwardly from an outer surface of the disc-shaped end plate 13a of the sensor cap 13. This sensor support member 19 has a bolt insertion hole 20 defined therein, which is disposed adjacent an outer surface of the disc-shaped end plate 13a of the sensor cap 13 in alignment with an opening of the insert nut 15. The bolt insertion hole 20 defined in the sensor support member 19 has a sleeve 21 tightly received therein. It will readily be seen that when a sensor fastening bolt 22 inserted into the sleeve 21 is threaded into the insert nut 15 rigid with the sensor cap 13, the sensor support member 19 can be firmly fastened to the disc-shaped end plate 13a of the sensor cap 13.

The disc-shaped end plate 13a of the sensor cap 13 has a reduced diameter hole 23 defined therein at a location adjacent a deep end face (i.e., an outboard end face) 15a of the insert nut 15 so as to extend from an internally threaded bore of the insert nut 15 to an inner surface of the disc-shaped end plate 13a of the sensor cap 13, that is, completely across a thick walled portion 13aa of the sensor cap 13, particularly an end wall of the mounting boss 28 then receiving therein the insert nut 15. This reduced diameter hole 23 has a counter surface 24 defined in an inner peripheral surface thereof, which surface 24 is opposed to the deep end face 15a of the insert nut 15.

A sealing member 25 in the form of a rubber ball having an elasticity is interposed between the counter surface 24 of the reduced diameter hole 23 and the deep end face 15a of the insert nut 15 under interference fit left therebetween, i.e., in a radially inwardly compressed state, to thereby seal the reduced diameter hole 23 when the rubber ball 25 nested within the reduced diameter hole 23 restores to the original spherical shape. Material for the sealing member, that is, the rubber ball 25 is one selected from the group consisting of, for example, nitrile rubber, fluorocarbon rubber, acrylic rubber and hydrogenated nitrile rubber.

The inner peripheral surface of the reduced diameter hole 23 represents a generally spherical shape in conformity with the shape of the sealing member 25. A portion of the disc-shaped end plate 13a of the sensor cap 13, which is generally aligned with the deep end face 15a of the insert nut 15 is formed with the thick walled portion 13aa that protrudes axially inwardly (i.e., rearwardly) of the end plate 13a and an annular protuberance 13ab is provided so as to protrude rearwardly of the thick walled portion 13aa. The spherical inner surface of the reduced diameter hole 23, which defines the counter surface 24, is formed in both of the thick walled portion 13aa and the annular protuberance 13ab.

With the wheel support bearing assembly so constructed as hereinbefore described, surfaces of contacts of the internally threaded bore of the insert nut 15 and between the outer periphery of the insert nut 15 and that portion of the sensor cap 13, which is made of the synthetic resin, are communicated with the inside of the bearing assembly only through the reduced diameter hole 23 and nowhere in the vicinity of the internally threaded bore and the sensor fastening bolt is communicated with the inside of the bearing assembly. The reduced diameter hole 23 referred to above is sealed in the presence of the sealing member 25. For this reason, slight gaps present between the internally threaded bore of the insert nut 15, the sensor fastening bolt 22 and the sensor support member 19 are sealed off from the inside of the bearing assembly and, accordingly, an undesirable ingress of the foreign matter such as, for example, muddy water into the inside of the bearing assembly through those gaps can be prevented by the sealing function of the sealing member 25.

Also, since the sealing member 25 is employed in the form of the rubber ball and since the reduced diameter hole 23 represents a hole having an inner peripheral surface so shaped as to form the interference allowance with the rubber ball and is formed in part in the thick walled portion 13aa of the sensor cap 13, which is positioned at a location aligned with the deep end face 15a of the insert nut 15, and in part in the annular protrusion 13ab protruding rearwardly of the thick walled portion 13aa and having an inner peripheral surface thereof defining the counter surface 24, the sealing member 25 can easily be fitted with a simplified structure. Also, since the sealing member 25, which is spherical in shape, is disposed inside the reduced diameter hole 23 under interference fit, the sealability can be excelled.

In the practice of the present invention, the reduced diameter hole 23 has a diameter d that is one half or less than the outer diameter D of the insert nut 15. However, in view of limitations imposed on the molding, the diameter d is preferably 1/6 or greater than, and more preferably within the range of 3/7 to 1/4, of the outer diameter D. The diameter d in this embodiment shown in FIG. 2 is 1/3 of the outer diameter D.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly comprising:
    an outer member adapted to be secured to a vehicle body structure and having an inner peripheral surface formed with a plurality of raceways defined therein;
    an inner member adapted to support a vehicle wheel and having raceways defined therein in alignment with the respective raceways in the outer member;
    corresponding circular rows of rolling elements each row interposed between the raceway in the outer member and the raceway in the inner member;
    a sensor cap secured to an inboard end of the outer member to close an inboard opening of the outer member;
    an insert nut embedded in a portion of the sensor cap, which is made of a synthetic resin, with its one open end opening at outer surface of the sensor cap, a sensor insertion hole being defined in the sensor cap in a juxtaposed relation with the insert nut;
    a sensor support member carrying a sensor arranged on an outer surface of the sensor cap with the sensor inserted into the sensor insertion hole and having a bolt insertion hole defined therein;
    a sensor fastening bolt inserted into the bolt insertion hole and then threaded into the insert nut to fix the sensor support member to the sensor cap; and
    a pulsar ring provided on the inner member so as to confront the sensor and cooperable with the sensor;
    wherein the sensor cap has a reduced diameter hole defined therein at a location adjacent a deep end face of the insert nut so as to communicate between an internally threaded bore of the insert nut and the inside of the sensor cap, which reduced diameter hole has an inner peripheral surface formed with a counter surface confronting the deep end face of the insert nut; and
    wherein a sealing member having an elasticity is interposed between the counter surface of the reduced diameter hole and the deep end face of the insert nut under interference fit therebetween for thereby sealing.

2. The wheel support bearing assembly as claimed in claim 1, wherein the sensor is a rotation sensor for detecting revolution of the inner member relative to the outer member.

3. The wheel support bearing assembly as claimed in claim 2, wherein material for the rubber ball is chosen from the group consisting of nitrile rubber, fluorocarbon rubber, acrylic rubber and hydrogenated nitrile rubber.

4. The wheel support bearing assembly as claimed in claim 2, wherein the reduced diameter hole has a spherical inner surface and is formed in part in a thick walled portion of the sensor cap, positioned at a location aligned with the deep end face of the insert nut, and in part in an annular protrusion protruding rearwardly of the thick walled portion and having an inner peripheral surface thereof defining the counter surface.

5. The wheel support bearing assembly as claimed in claim 1, wherein the sealing member is a rubber ball.

6. The wheel support bearing assembly as claimed in claim 1, wherein the sensor cap has an axially extending cylindrical wall made of the synthetic resin and also has a metallic reinforcement ring within the axially cylindrical wall.

* * * * *